C. G. OLSON.
DRIVE FOR MACHINE TOOLS.
APPLICATION FILED MAR. 24, 1917.
1,232,715.
Patented July 10, 1917.
3 SHEETS—SHEET 2.
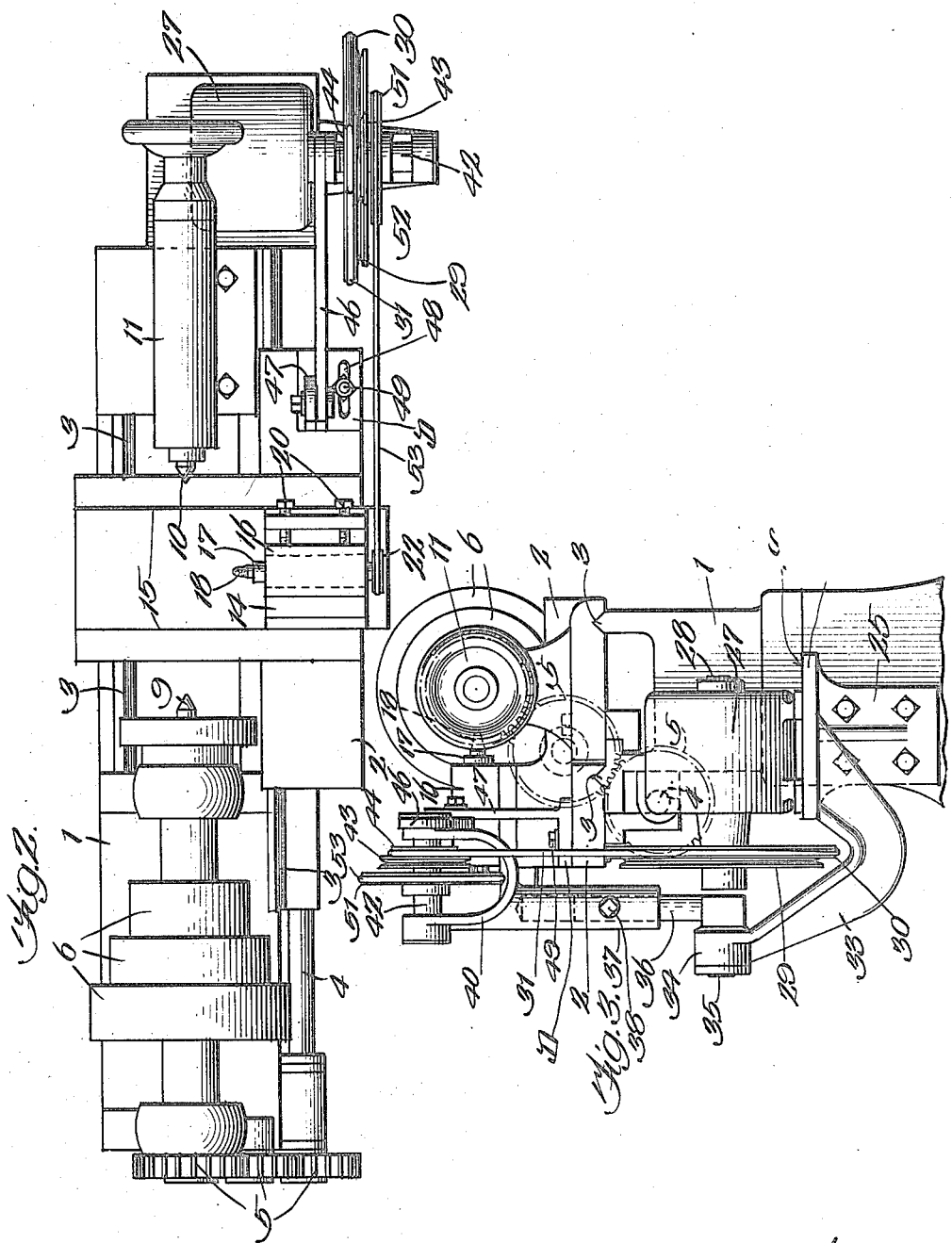
Inventor:
Carl G. Olson.
By Cheever & Cox
Attys.

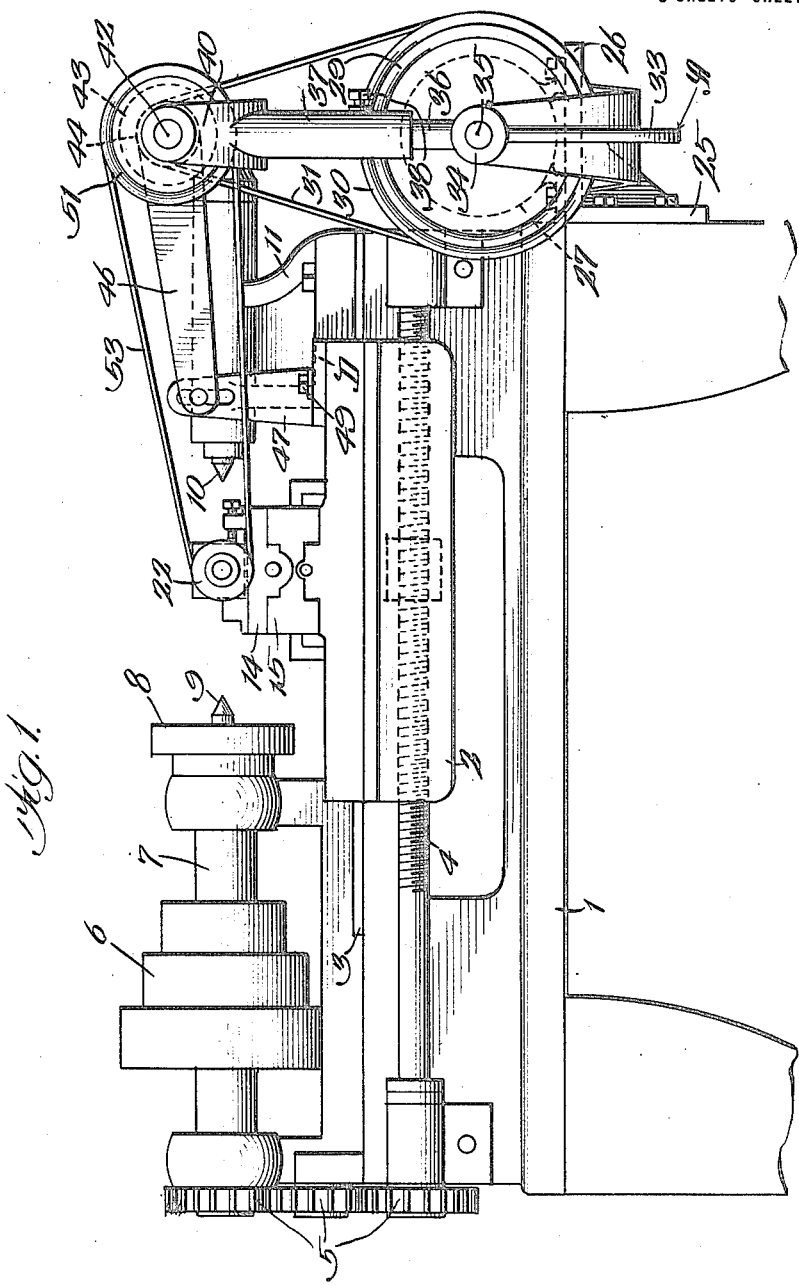

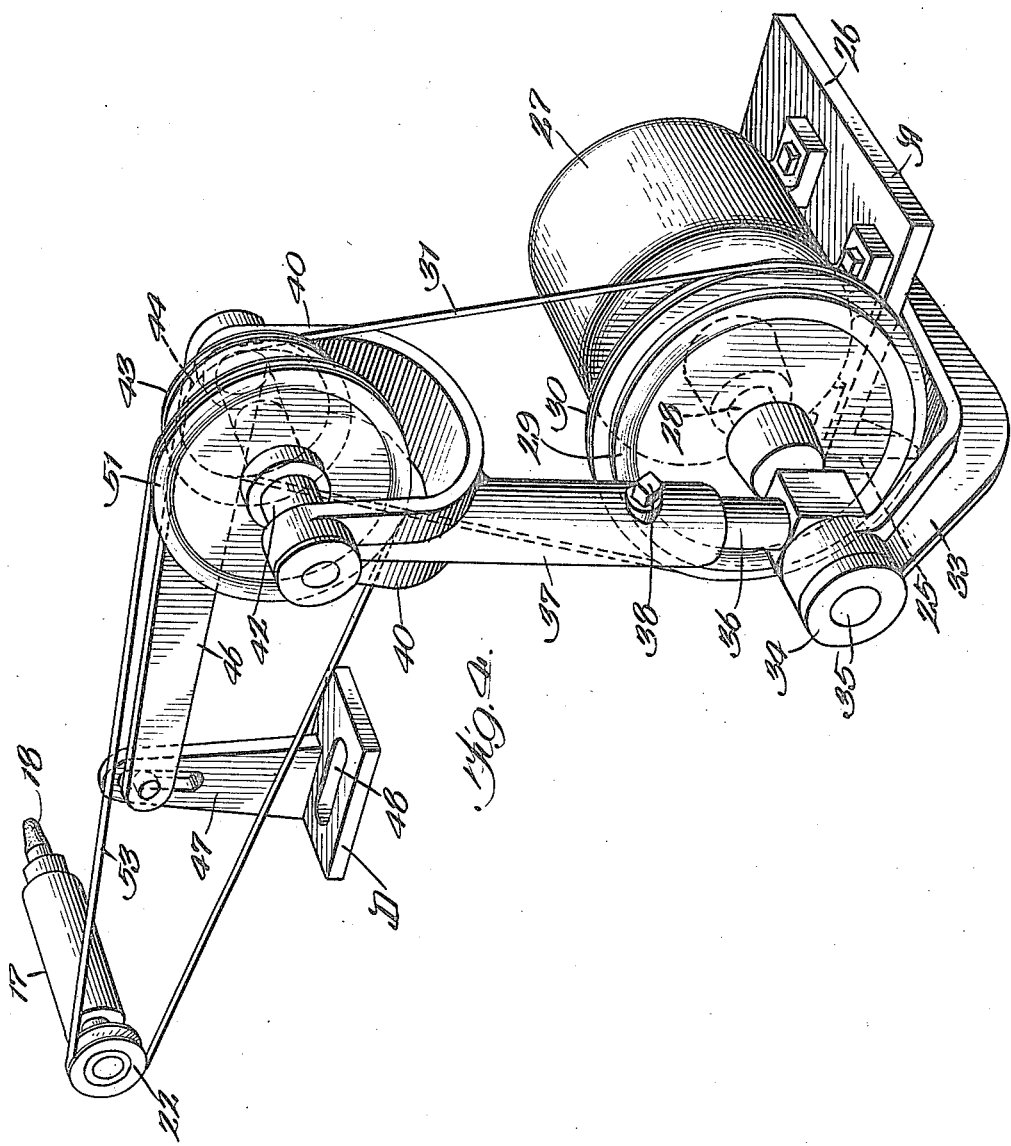

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

DRIVE FOR MACHINE-TOOLS.

1,232,715.  Specification of Letters Patent.  Patented July 10, 1917.

Application filed March 24, 1917. Serial No. 157,096.

*To all whom it may concern:*

Be it known that I, CARL G. OLSON, a citizen of the United States, residing at Chicago, in the county of Cook and State of Illinois, have invented a certain new and useful Improvement in Drives for Machine-Tools, of which the following is a specification.

My invention relates to motor drives for machine tools and is especially useful in cases where it is desired to drive a grinder or other tool which has a traveling as well as a rotary motion and is to operate upon a piece of work which is rotating about an axis parallel to the direction of travel of said grinder or other tool. The object of the invention is to provide a construction in which the motor remains stationary, either on the floor or on some stationary part of the machine, while the grinder or other tool to be driven travels with the carriage and is driven by belts so mounted as to maintain always the same tension. Another object is to provide means for adjustment whereby the individual belts may be tightened or loosened as the case may require. Another object is to provide a construction by which the grinder or other driven tool may be moved toward and from the axis of the rotating piece of work without changing or materially changing the tension of the belts.

In order to explain the invention, I have chosen to illustrate it in connection with a lathe having a traveling carriage with a rotating grinder located in the tool post.

In the drawings,

Figure 1 is a side view of a lathe equipped with mechanism embodying my invention.

Fig. 2 is a top plan view thereof.

Fig. 3 is an end view looking toward the left in Fig. 1.

Fig. 4 is a perspective view of the mechanism separate from the lathe.

Like parts are denoted by like reference numerals in the different figures of the drawings.

In the form selected to illustrate the invention, the lathe has a frame 1 provided with a carriage 2 which travels upon guides or ways 3. A lead screw 4 causes the carriage to travel in the usual manner and is connected by gearing 5 to the drive pulleys 6. Said pulleys are mounted on the shaft 7 in the head stock of a lathe and rotate a face plate 8 and head center 9 as usual. A tail center 10 is mounted in the stationary tail stock 11.

The tool post 14 slides upon guides 15 formed upon the carriage transverse to the guides 3 for guiding the tool toward and from the line of the centers 9, 10. Said tool post has a holder 16 in which, in the present case, there is mounted a high speed spindle 17 containing a grinding point 18. Said holder is adjustably mounted on the tool post, being movable parallel to the direction of travel of the main carriage and held in proper position by adjusting screws 20. Spindle 17 is driven by a belt pulley 22.

Turning now to the motor and the mechanism more intimately associated therewith: A bracket 25 is fastened to the machine frame 1 and has a platform 26 which supports the motor 27. Fastened to the motor shaft 28 are two drive pulley 29, 30, either one of which will drive the belt 31 depending upon the speed ratio desired. Bracket 25 has an arm 33 extending out under the pulleys 29, 30. At the upper end of arm 33 is a bearing 34 which supports an arbor 35 in alinement with the motor shaft. Extending upward from said arbor is a rod 36 which telescopes into a hollow cylindrical post 37. Said post is vertically adjustable on rod 36 by means of a set screw 38. At the upper end post 37 bifurcates into two branches 40 which are provided with journal bearings for supporting a counter shaft 42. Said counter shaft is provided with two belt pulleys 43 and 44. As arbor 35 is in line with the motor shaft, the rod 36, post 37 and parts thereon may rotate about said arbor without changing the tension of belt 31.

Extending from counter shaft 42 is a link 46 which is articulately connected at its opposite end to a bracket 47 mounted on the carriage 2. The link extends parallel to the direction of travel of the carriage and in a plane at right angles to the motor shaft 28 and arbor 35. The base of the bracket has a slot 48 extending parallel to the direction of travel of the carriage and is therefore adjustable, being held by a bolt 49 on the carriage. The link extends in the general direction of the axis of the spindle 17 and reaches to within a slight distance of it, as shown. Rigidly fastened on the counter shaft 42 alongside the pulleys 43 and 44 is a pulley 51 which is connected to the pulley 22 by a belt 53.

The operation will now be apparent. When the parts are assembled as shown, and the motor is started, the motor will drive the belt 31 and this, acting through the pulleys on the counter shaft 42, will drive the belt 53 which drives the spindle. The position of the upper end of the post 37 will be governed by the link 46, and this is controlled by the same carriage which carries the spindle. In other words, the bracket 47 which controls the link travels horizontally in unison with the spindle 17. Hence the belt 53 always remains tight for the upper end of post 37 travels back and forth in unison with the carriage. It is true that the link 46 does not extend quite to the axis of the spindle and hence there is theoretically a slight variation in the tension of belt 53 for different positions of the carriage. But within the practical operating limits of travel of the carriage, the variation in tension is practically *nil*, and to all intents and purposes the tension remains constant. With respect to the belt 31, its tension remains constant in all positions of post 37 because counter shaft 42 always moves in a circle concentric with the motor shaft.

In addition to its rotary movement, the spindle moves transversely to the plane of the belt 53, but the length of the belt and the depth of the grooves of the pulley are such that this movement of the spindle may occur within all practical limits of operation without materially altering the tension of the belt.

From the foregoing it will be seen that as a result of my construction, the spindle travels back and forth in unison with the carriage and moves toward and from the work without changing the tension of the belt to any appreciable degree. The action is automatic and the operator is free to manipulate the rotating spindle just as if it were an ordinary non-rotating cutting tool. No alteration in the lathe is required, and the present attachment may be readily removed. For the purpose of removal, it is necessary simply to unbolt the bracket 47 from the carriage, take the spindle out of the tool post and loosen the set screw 38 and lift the post 37 off of the rod 36. When this is done, practically nothing will remain except the motor itself.

Having thus described my invention, what I claim as new and desire to secure by Letters Patent, is:—

1. In combination, a traveling carriage, a spindle mounted thereon for operating a rotating tool, a stationary motor, an arm having a stationary pivot coincident with the axis of the motor, a pulley at the free end of said arm driven by said motor, connections between the pulley and the spindle for causing the latter to rotate, and a link connected at one end to the carriage and at the other end to the free end of the arm for maintaining a substantially constant distance between the free end of the arm and the axis of the spindle.

2. In mechanism of the class described, the combination of a stationary frame, a carriage traveling upon said frame, a spindle journaled upon said carriage and having an axis transverse to the line of travel of the carriage, a stationary motor, an arm having a stationary pivot co-axial with the motor, a counter pulley at the free end of said arm driven by said motor, said counter pulley being connected to said spindle for rotating it, and a link connected to the free end of the arm and also connected to the carriage at a point near the axis of the spindle for maintaining a substantially constant distance between the counter pulley and the spindle, said spindle also being movable in the direction of its axis.

3. In mechanism of the class described, the combination of a stationary frame, a carriage traveling thereon, a motor mounted on said frame, a pivoted arm having an axis coincident with the motor axis, a pulley at the free end of said arm driven by said motor, a spindle mounted on said carriage, a pulley belted to the counter pulley for driving said spindle, a bracket mounted upon said carriage and adjustable thereon in a direction parallel to the line of travel of the carriage and transverse to the axis of the spindle, and a link articulately connected to said bracket and to the free end of said arm for the purpose described.

4. A machine tool having a stationary frame, a carriage traveling on it, means for rotating a piece of work about an axis parallel to the line of travel of the carriage, a tool holder mounted on said carriage and movable transverse to the line of travel thereof, a spindle in said tool holder, a pulley for rotating said spindle, a stationary motor, an arm having a stationary pivot coincident with the axis of the motor, said arm having telescoping sections whereby the effective length may be varied, a counter pulley mounted at the free end of said arm driven by said motor, a pulley driven by said counter pulley for rotating the spindle, and a link connected to the free end of the arm and connected to the carriage for maintaining a substantially constant distance between the axis of the counter pulley and the axis of the pulley which drives the spindle.

In witness whereof, I have hereunto subscribed my name.

CARL G. OLSON.